(12) United States Patent
Davis et al.

(10) Patent No.: US 7,914,920 B2
(45) Date of Patent: Mar. 29, 2011

(54) BATTERY SEPARATOR

(75) Inventors: Stuart M. Davis, Norfolk, MA (US); Jonathan M. Boulton, North Attleboro, MA (US); Cahit Eylem, Bellingham, MA (US); Ou Mao, Walpole, MA (US)

(73) Assignee: The Gillette Company, Boston, MA (US)

( * ) Notice: Subject to any disclaimer, the term of this patent is extended or adjusted under 35 U.S.C. 154(b) by 924 days.

(21) Appl. No.: 10/682,740

(22) Filed: Oct. 9, 2003

(65) Prior Publication Data

US 2005/0079424 A1   Apr. 14, 2005

(51) Int. Cl.
*H01M 10/24* (2006.01)
*H01M 2/16* (2006.01)

(52) U.S. Cl. .................. 429/144; 429/206

(58) Field of Classification Search ............ None
See application file for complete search history.

(56) References Cited

U.S. PATENT DOCUMENTS

| | | |
|---|---|---|
| 3,923,550 A * | 12/1975 | von Krusenstierna .......... 429/68 |
| 3,951,687 A | 4/1976 | Takamura et al. |
| 3,953,241 A | 4/1976 | Langer et al. |
| 4,037,033 A | 7/1977 | Takamura et al. |
| 4,262,061 A | 4/1981 | Rogers |
| 4,273,840 A * | 6/1981 | Machi et al. ................ 429/144 |
| 4,277,547 A | 7/1981 | Verzwyvelt |
| 4,361,632 A | 11/1982 | Weber et al. |
| 4,378,414 A * | 3/1983 | Furukawa et al. ........... 429/144 |
| 4,734,344 A | 3/1988 | Choi |
| 4,853,101 A | 8/1989 | Hruska et al. |
| 5,298,348 A | 3/1994 | Kung |
| 5,336,573 A | 8/1994 | Zuckerbrod et al. |
| 5,342,709 A | 8/1994 | Yahnke et al. |
| 5,389,471 A | 2/1995 | Kung |
| 5,770,256 A * | 6/1998 | Ekern et al. .................. 427/58 |
| 5,824,434 A | 10/1998 | Kawakami et al. |
| 5,948,557 A | 9/1999 | Ondeck et al. |
| 6,060,196 A * | 5/2000 | Gordon et al. ............... 429/229 |
| 6,306,545 B1 | 10/2001 | Carlson et al. |
| 6,447,958 B1 | 9/2002 | Shinohara et al. |
| 6,495,292 B1 | 12/2002 | Yen |
| 6,541,160 B2 | 4/2003 | Cheiky et al. |
| 6,558,849 B2 | 5/2003 | Cheiky et al. |
| 2002/0182511 A1* | 12/2002 | Cheiky et al. ............... 429/255 |
| 2003/0180622 A1* | 9/2003 | Tsukuda et al. ............. 429/249 |
| 2005/0079424 A1* | 4/2005 | Davis et al. ................. 429/247 |
| 2006/0257728 A1* | 11/2006 | Mortensen et al. ........... 429/144 |

* cited by examiner

*Primary Examiner* — Ula C. Ruddock
*Assistant Examiner* — Alix Echelmeyer
(74) *Attorney, Agent, or Firm* — Fish & Richardson P.C.

(57) ABSTRACT

A battery includes a separator with a trapping layer that traps dissolved metal ions.

69 Claims, 2 Drawing Sheets

BATTERY SEPARATOR

TECHNICAL FIELD

The invention relates to batteries.

BACKGROUND

Batteries, such as alkaline batteries, are commonly used as electrical energy sources. Generally, a battery contains a negative electrode (anode) and a positive electrode (cathode). The anode contains an active material (e.g., zinc particles) that can be oxidized; and the cathode contains an active material (e.g., manganese dioxide) that can be reduced. The active material of the anode is capable of reducing the active material of the cathode. In order to prevent direct reaction of the active material of the anode and the active material of the cathode, the electrodes are electrically isolated from each other by a separator.

When a battery is used as an electrical energy source in a device, such as a cellular telephone, electrical contact is made to the electrodes, allowing electrons to flow through the device and permitting the respective oxidation and reduction reactions to occur to provide electrical power. An electrolyte in contact with the electrodes contains ions that flow through the separator between the electrodes to maintain charge balance throughout the battery during discharge.

SUMMARY

In one aspect, the invention features an alkaline battery with an electrolyte, a cathode that includes an active material (e.g., a copper oxide), and a multilayer separator. The multilayer separator includes a trapping layer with a trapping component (e.g., a metal). In some cases, the cathode active material can dissolve in the electrolyte, forming dissolved metal ions (e.g., metal cations, polyatomic ions) that can lower the capacity and/or shelf life of the battery. The trapping layer can reduce and/or sorb the metal cation components of these dissolved metal ions, thereby enhancing the storage life and/or capacity of the battery.

In one aspect, the invention features a battery. The battery has a separator with a layer that includes a material that is capable of reducing a metal cation component of a dissolved ion.

In another aspect, the invention features a battery. The battery has a cathode that includes a copper oxide, an anode that includes zinc, and a separator between the cathode and the anode. The separator has a first layer that includes cellophane, a second layer that includes bismuth, a third layer that includes zirconium dioxide, and a fourth layer that includes a non-woven material.

Other aspects, features, and advantages of the invention will be apparent from the drawing, description, and claims.

DETAILED DESCRIPTION

Figure 1:
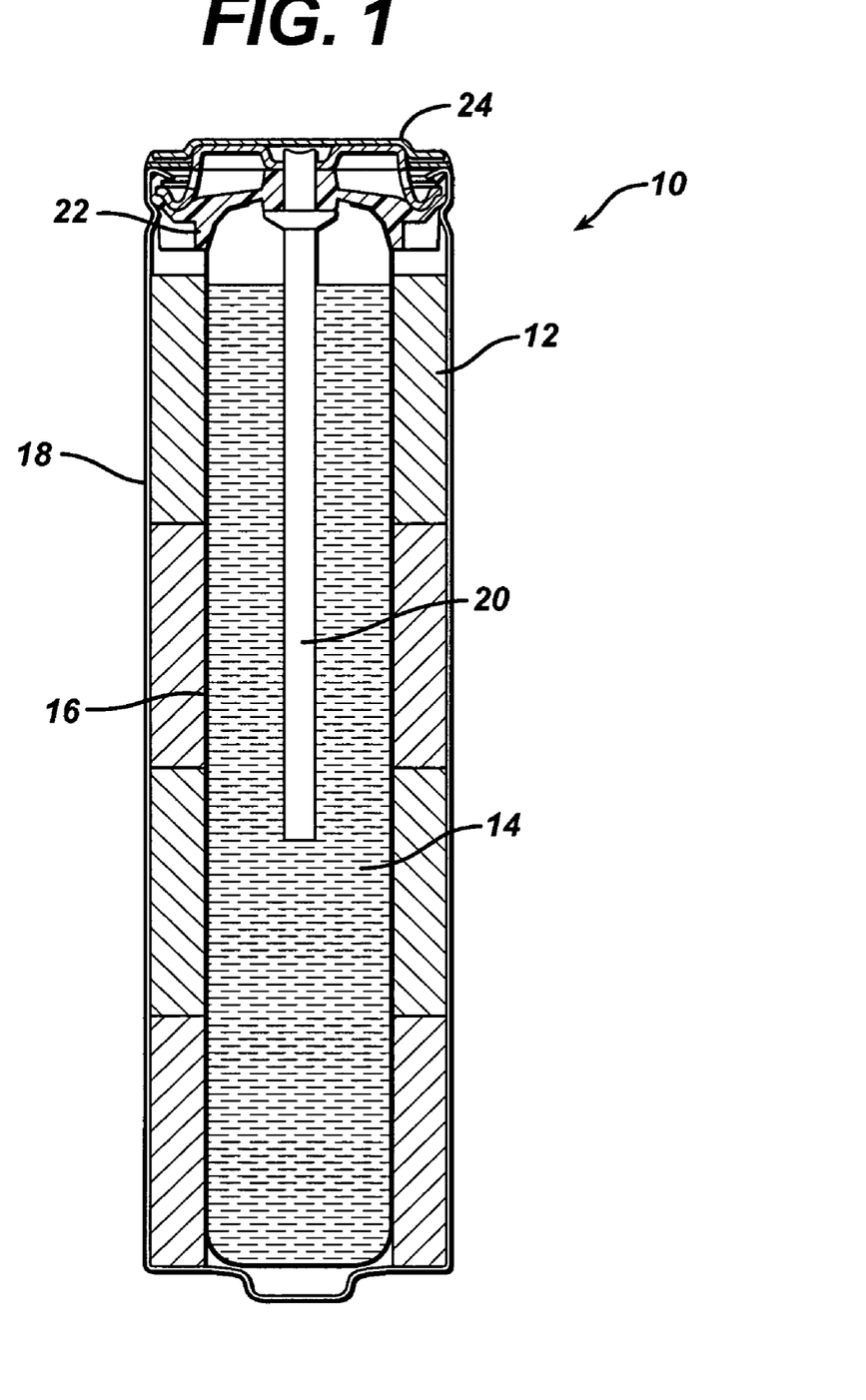
FIG. 1 is a cross-sectional view of an embodiment of a battery.

Referring to FIG. 1, a battery or electrochemical cell 10 includes a cylindrical housing 18 containing a cathode 12, an anode 14, and a separator 16 between the cathode and anode. Cathode 12 includes an active copper material (e.g., a copper oxide), and anode 14 includes an active zinc material. Battery 10 also includes a current collector 20, a seal 22, and a metal top cap 24, which serve as the negative terminal for the battery. Cathode 12 is in contact with housing 18, and the positive terminal of battery 10 is at the end of the battery opposite from the negative terminal. An electrolyte is dispersed throughout battery 10.

In some cases, the electrolyte can dissolve the cathode active material (such as a copper material). For example, if the electrolyte is a relatively concentrated alkaline electrolyte (such as potassium hydroxide), and if the cathode contains a copper material such as CuO, then the electrolyte can dissolve the copper material to form $Cu(OH)_4^{2-}$ ions. The $Cu(OH)_4^{2-}$ ions can then diffuse to anode 14, where they form copper metal and consume zinc:

$$Zn + Cu(OH)_4^{2-} \rightarrow Zn(OH)_4^{2-} + Cu \qquad (1)$$

As both the cathode active material and the anode active material are consumed, the capacity of the battery decreases. In some cases, the copper metal causes the evolution of hydrogen gas at anode 14, thereby increasing the pressure within the battery and potentially causing the battery to vent and leak. Furthermore, the copper metal can form dendrites that extend from the anode toward the cathode. The dendrites can penetrate the separator and contact the cathode, thereby short circuiting the battery. Consequently, the storage life of the battery can be short and/or unreliable. Separator 16 is configured to limit or prevent contact between the anode active material and dissolved metal ions from the cathode active material. Because of separator 16, battery 10 may experience a reduced likelihood of short circuiting and/or gassing. As a result, battery 10 may be less likely vent and leak its internal contents. For these reasons and others, separator 16 can enhance the storage life and capacity of battery 10. Furthermore, separator 16 can achieve these advantages while being relatively non-toxic and/or environmentally benign.

Separator 16 includes one or more selective membranes, trapping layers, and/or non-woven layers.

Figure 2:
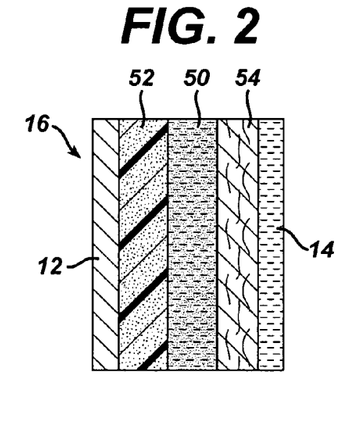
FIG. 2 is a schematic view of an embodiment of a separator.

Referring to FIG. 2, separator 16 has a multilayer (i.e., more than one layer) construction with a trapping layer 50 bonded on one side to a selective membrane 52, and on another side to a non-woven layer 54. In FIG. 2, selective membrane 52 is positioned by cathode 12, while non-woven layer 54 is positioned by anode 14.

As dissolved metal ions from the cathode active material travel through trapping layer 50, the trapping layer reduces and/or sorbs (e.g., adsorbs and/or absorbs) the metal cation components of the dissolved metal ions. For example, the trapping layer can react with $Cu(OH)_4^{2-}$ ions (dissolved metal ions) to reduce copper (II) (the metal cation component of the $Cu(OH)_4^{2-}$ ions), thereby forming copper metal. Trapping layer 50 includes a solvent- and ion-permeable gel matrix, such as poly(acrylic acid), poly(vinyl alcohol), poly(ethyleneoxide), poly(vinylpyrrolidone), poly(acrylamide), poly(vinyl butyral), or poly(4-styrenesulfonic acid). Trapping layer 50 also includes one or more (e.g., two, three, four, five) trapping components capable of reducing and/or sorbing (e.g., adsorbing or absorbing) the metal cation components of the dissolved metal ions. In some embodiments, trapping layer 50 includes one trapping component, "TC1", while in other embodiments, trapping layer 50 includes two trapping components, "TC1" and "TC2".

TC1 can be a metal (e.g., bismuth, tin, zinc, indium, cadmium, lead); a metal oxide (e.g., titanium oxide (TiO), an iron oxide (such as $Fe_3O_4$ or FeO), a niobium oxide (such as NbO or $NbO_2$)); a metal hydride (e.g., titanium hydride ($TiH_2$), zirconium hydride ($ZrH_2$), a misch-metal alloy hydride); or a salt (e.g., a metal salt, such as tin sulfide (SnS), bismuth sulfide ($Bi_2S_3$), iron sulfide (FeS)). In some cases, TC1 can be an organic material, such as an oxalate (e.g., magnesium oxalate ($MgC_2O_4.2H_2O$)) or a tartrate (e.g., bismuth tartrate ($Bi_2(C_4H_4O_6.6H_2O)$)). In certain embodiments, TC1 is an organic complexing agent (e.g., benzo-triazole, tolyl triazole). In some embodiments, TC1 can be a metalorganic material (e.g., zinc diethyldithiocarbamate).

Trapping component TC1 can have a reduction potential that is more negative than the reduction potential of the metal cation component of the targeted dissolved metal ion. As a result, when TC1 comes into contact with the dissolved metal ion, TC1 can reduce the metal cation component of the dissolved metal ion to a metal. After reduction by TC1, the metal is insoluble and can be prevented from traveling to the anode by one of the layers of the separator (e.g., the trapping layer, which can trap the metal). In some embodiments, trapping component TC1 has a reduction potential that is from about ten millivolts to about 2,100 millivolts negative to the reduction potential of the metal cation component of the dissolved metal ion. In certain embodiments, TC1 has a reduction potential that is from about 500 millivolts to about 1,500 millivolts (e.g., about 600 millivolts) negative to the reduction potential of the metal cation component of the dissolved metal ion (e.g., at pH 16). For example, if the dissolved metal ion is a species of silver (II) (e.g., $Ag(OH)_4^{2-}$) originating from, e.g., a silver oxide (AgO) cathode, and trapping component TC1 is zinc, then at pH 16 the zinc can exhibit a reduction potential that is approximately 1,850 millivolts negative to reduction potential of the metal cation component of the dissolved $Ag(OH)_4^{2-}$.

In some cases, TC1 has a reduction potential that is positive to the reduction potential of hydrogen (e.g., as measured in an electrolyte), such that TC1 may be unlikely to cause hydrogen gassing. For example, bismuth has a reduction potential that is positive (by approximately 400 millivolts) to the reduction potential of hydrogen. Alternatively, TC1 can have a reduction potential that is slightly negative to the reduction potential of hydrogen (e.g., as measured in an electrolyte). For example, TC1 can have a reduction potential that is from about one millivolt to about 150 millivolts negative to the reduction potential of hydrogen. Tin has a reduction potential that is slightly negative (by approximately 100 millivolts) to the reduction potential of hydrogen. In other cases, TC1 can have a reduction potential that is substantially negative to the reduction potential of hydrogen (e.g., as measured in an electrolyte). For example, TC1 can have a reduction potential that is from about 150 millivolts to about 600 millivolts negative to the reduction potential of hydrogen. In such cases, TC1 preferably has a high hydrogen gas evolution overpotential (e.g., from about 500 millivolts to about 750 millivolts of overpotential measured at a $H_2$ evolution current density of one $mA/cm^2$ in alkaline electrolyte, such as 6N KOH), so that TC1 will not cause hydrogen gas to evolve at an appreciable rate. For example, although zinc has a reduction potential that is about 500 millivolts negative to the reduction potential of hydrogen (when both are measured in an alkaline electrolyte at a pH of approximately 16), zinc has an high overpotential for hydrogen gas evolution (about 720 millivolts at a current density of one $mA/cm^2$). Thus, the actual rate of $H_2$ evolution from a zinc surface, at its rest potential, can be very low (e.g., about 0.02 microliter/hr/$cm^2$, as measured in 35.3% KOH with 2% dissolved ZnO at 60° C. and 760 torr).

Preferably, the product of the reaction between TC1 and the dissolved metal ion is relatively insoluble (e.g., from about $10^{-5}$ moles/liter to about $10^{-3}$ moles/liter) in the electrolyte. In cases in which the product of the reaction between TC1 and the dissolved metal ion is somewhat soluble in the electrolyte, it is preferable for the reaction product not to detrimentally affect the active material of the electrodes.

TC1 can be added to trapping layer 50 according to a number of different methods. For example, TC1 can be added to the trapping layer by dispersing a powdered version of TC1 within a gel matrix and applying the resultant gel or suspension to one of the sheet components of the separator (e.g., the non-woven layer or the selective membrane). As another example, a dispersion of TC1 in a gel matrix can be prepared and cast or coated onto a release liner to form a layer. The layer can then be dried, stripped from the release liner, and adhered to one of the sheet components of the separator. As another example, a paint- or ink-like dispersion of TC1 can be prepared and coated, printed or sprayed directly onto one of the sheet components of the separator. In some embodiments, the above-mentioned gel coatings and/or paint- or ink-like dispersions can also be used as adhesives that laminate the various layers of the separator together. As another example, TC1 can be formed on or in the trapping layer. For example, if TC1 is a metal, then it can be formed on or in the trapping layer by, e.g., the chemical or electrochemical reduction of a metal salt on or in the trapping layer. In such cases, TC1 can be formed on or in the trapping layer prior to assembly of the multilayer separator.

In some embodiments of separator 16, trapping layer 50 further includes another trapping component. For example, when the reaction between TC1 and the dissolved metal ion yields a soluble product (e.g., $Bi_2O_3$, $Bi(OH)_3$, or $Bi(OH)_4^-$), then trapping layer 50 can include a second trapping component TC2. Trapping component TC2 is capable of reacting with (e.g., sorbing) the soluble product to yield an insoluble product. In some cases, TC2, in its unreacted state, is relatively insoluble in the electrolyte. For example, TC2 can have a solubility in the electrolyte of from about $10^{-7}$ moles/liter (e.g., about 0.01 milligrams/liter) to about $10^{-4}$ moles/liter (e.g., about ten milligrams/liter). In other cases, TC2 is somewhat soluble in the electrolyte (e.g., about $10^{-3}$ moles/liter or about 100 milligrams/liter). Preferably, TC2 does not detrimentally affect the active material of the electrodes. TC2 can be, for example, titanium dioxide ($TiO_2$) or zirconium dioxide ($ZrO_2$). As an example, both titanium dioxide and zirconium dioxide can absorb dissolved $Bi(OH)_3$ to form products which are insoluble in 9N KOH.

The trapping component or trapping components can have a relatively open (e.g., porous) structure. For example, the trapping component(s) can be in the form of a perforated foil or film, a woven mesh, a wire, and/or a filament. In some cases, the trapping component(s) can be in powdered form or can be dust.

The structure of the trapping layer can provide channels for ion and/or solvent transmission. The trapping component(s) in the trapping layer can form a network that is not electronically conductive. The trapping component(s) can be in the form of a relatively discontinuous network that includes, for example, metal particles surrounded by an adhesive polymer matrix (such that the metal particles generally are not in contact with each other). The polymer matrix can be a gel which allows for permeation of electrolyte ions and electrolyte solvent.

In embodiments in which the trapping layer includes two different trapping components, TC1 and TC2, the trapping components can be admixed or can be independent from each other (e.g., located in separate regions of the trapping layer). For example, in a trapping layer that includes both bismuth metal and zirconium dioxide as trapping components, the bismuth metal and the zirconium dioxide can be admixed. Alternatively, the bismuth metal and the zirconium dioxide can be suspended in separate sub-layers of the trapping layer. For example, the bismuth metal and the zirconium dioxide can be suspended in adjacent sub-layers of a polymer gel, with one sub-layer including primarily bismuth metal and the other sub-layer including primarily zirconium dioxide. In some embodiments, the bismuth metal is suspended primarily in a first polymer gel, while the zirconium dioxide is suspended primarily in a second, different polymer gel that is adjacent to the first polymer gel. The gel can be selected based on its compatibility with the trapping component(s) that are used.

The trapping layer can have a thickness of from about one micron to about 500 microns (e.g., about 65 microns). In some embodiments, the thickness of the trapping layer is from about 30 percent to about 70 percent of the thickness of the entire separator.

Selective membrane 52 controls and/or limits the diffusion of dissolved metal ions from the cathode, thereby preventing the trapping layer from being inundated with dissolved metal ions over a short period of time. The electrolyte is generally able to travel through selective membrane 52. The selective membrane can be, for example, cellophane or grafted polyethylene. The thickness of the selective membrane can be from about ten microns to about 40 microns (e.g., about 20 microns). In some embodiments, the thickness of the selective membrane is from about ten percent to about 15 percent of the thickness of the entire separator.

Non-woven layer 54 is a fibrous membrane or fabric with good chemical and/or mechanical properties. For example, the non-woven layer can have one or more of the following properties: uniform thickness (e.g., 0.060 mm±0.006 mm); uniform pore size; high tear strength; chemical stability toward the cell electrolyte; chemical stability toward the anode and/or cathode active materials; high rate of electrolyte absorption (e.g., greater than about 100 grams/m$^2$); high rate of electrolyte permeation and diffusion; low ionic resistivity; and a low basis weight (e.g., less than about 30 grams/m$^2$). The non-woven layer can provide support for separator 16. Unlike selective membrane 52, non-woven layer 54 generally is not selective with regard to dissolved ions. The non-woven layer conducts the electrolyte well, and thus can maintain a reservoir of electrolyte between the cathode and the anode. Non-woven layer 54 can be a fibrous polymer fabric (e.g., polyvinyl alcohol fibers and/or rayon fibers bonded with a polyvinyl alcohol binder). The thickness of the non-woven layer can be from about 30 microns to about 120 microns (e.g., about 60 microns). In some embodiments, the thickness of the non-woven layer is from about 25 percent to about 60 percent of the thickness of the entire separator. Separator 16 can be assembled according to a number of different methods. In some embodiments, the trapping layer of the separator is assembled first. In certain embodiments, trapping layer 50 is formed by blending powdered forms of the trapping component or components (e.g., TC1 and TC2) with a polymer adhesive solution. An example of a polymer adhesive solution is a solution that includes a polyacrylic acid gelling agent (e.g., 5% Carbopol 934, available from Noveon Inc.), an aqueous 25% poly(acrylic acid) solution (e.g., 20% Glascol E11, available from Ciba Specialty Chemicals), and 75% ethanol (or an aqueous solution of poly(vinyl alcohol)). After the trapping component(s) have been blended with the polymer adhesive solution, the mixture can be coated on a release liner (e.g., silicone coated Mylar). In some embodiments, trapping layer 50 can be formed by, e.g., extrusion, or by blowing a powder-loaded thermoplastic polymer film. In some cases, trapping layer 50 is formed by preparing a suspension of the trapping component or components in viscose, and then extruding the suspension into an acidic coagulating bath to form a regenerated cellulose/trapping component composite.

After the trapping layer has been formed, it can be incorporated into separator 16. The trapping layer can be incorporated into the separator by laminating it to the other layers of the separator. In some cases, the trapping layer is coated directly onto the non-woven layer and/or the selective membrane (e.g., using a doctor blade). In certain embodiments, the trapping layer is separate from the non-woven layer. The trapping layer can hold the components of the separator together. In some cases, the trapping layer is sprayed and/or printed onto one or more of the other layers of the separator, such as the non-woven layer.

Preferably, dissolved metal ions are prevented from gaining access around separator 16. In some embodiments, the seams of separator 16 can be glued together (e.g., with a hot-melt adhesive). In some cases, the bottom of the separator tube or cavity (i.e., the volume defined by the separator in which anode 14 is placed) may be closed with an adhesive seam. The bottom of the separator tube or cavity can be pinched or folded together and sealed. In certain embodiments, a separate bottom cup can be formed and inserted into the separator tube, or the separator tube can be inserted into the bottom cup. The bottom cup can include the same material and/or can have the same construction as the separator. The bottom cup can include any one or combination of the components of the separator, or can include a different material or materials from the separator. The material or materials used to form the bottom cup can be permeable or non-permeable. The seam between the bottom cup and separator tube can be sealed by an adhesive. In some embodiments, a plastic resin plug can be cast into the bottom of the separator tube to effect a closure. In some cases, the separator is formed of multiple (e.g., two, three, four) wraps of material.

Cathode 12 includes a conductive aid, a binder, and, as noted above, an active material (e.g., a copper material). Examples of cathode active materials include copper oxides (e.g., cupric oxide (CuO), cuprous oxide ($Cu_2O$)); copper hydroxides (e.g., cupric hydroxide ($Cu(OH)_2$), cuprous hydroxide (Cu(OH))); cupric iodate ($Cu(IO_3)_2$); $AgCuO_2$; $LiCuO_2$; $Cu(OH)(IO_3)$; $Cu_2H(IO_6)$; copper-containing metal oxides or chalcogenides; copper chlorides (e.g., $CuCl_2$); and copper permanganates (e.g., $Cu(MnO_4)_2$). The copper oxides can be stoichiometric (e.g., CuO) or non-stoichiometric (e.g., $CuO_x$, where $0.5 \leq x \leq 1.5$). In some embodiments, cathode 12 includes from about 65 percent to about 99 percent, preferably from about 75 percent to about 95 percent, and more preferably from about 85 percent to about 95 percent, of copper material by weight. All weight percentages provided herein are determined after the electrolyte has been dispersed. The copper material in cathode 12 can include only copper oxide, or a mixture of copper materials. For example, of the copper material in cathode 12, the cathode can include from about five percent to about 100 percent by weight of copper chloride(s) and/or copper permanganate(s), with the remainder being, e.g., cupric oxide.

If cathode 12 includes a copper material, then the cathode can release $Cu(OH)_4^{2-}$ or $Cu(OH)_4^{3-}$ ions into the electrolyte. The components of the trapping layer can react with the ions to form copper metal. For example, when trapping layer 50 includes bismuth, tin, or zinc, then the trapping layer can react with $Cu(OH)_4^{2-}$ ions according to the reactions shown below:

$$2Bi+3Cu(OH)_4^{2-} \rightarrow 3Cu+Bi_2O_3+3H_2O+6OH^- \quad (2)$$

$$Sn+2Cu(OH)_4^{2-} \rightarrow 2Cu+SnO_2+2H_2O+4OH^- \quad (3)$$

$$Zn+Cu(OH)_4^{2-} \rightarrow Cu+ZnO+H_2O+2OH^- \quad (4)$$

When the trapping layer contains $Fe_3O_4$, then the trapping layer generally will react with $Cu(OH)_4^{2-}$ ions as shown below:

$$2Fe_3O_4+Cu(OH)_4^{2-} \rightarrow Cu+3Fe_2O_3+H_2O+2OH^- \quad (5)$$

A trapping layer that includes titanium hydride can react with $Cu(OH)_4^{2-}$ ions as follows:

$$TiH_2+3Cu(OH)_4^{2-} \rightarrow 3Cu+TiO_2+4H_2O+6OH^- \quad (6)$$

Tin sulfide generally will react with $Cu(OH)_4^{2-}$ ions according to the reaction shown below:

$$2SnS+2Cu(OH)_4^{2-} \rightarrow 2Cu+SnS_2+SnO_2+2H_2O+4OH^- \quad (7)$$

A trapping layer that includes an organic reducing agent, such as an oxalate or a tartrate, can react with $Cu(OH)_4^{2-}$ ions to form copper metal, as well as aldehydes, ketones, organic acids, carbon dioxide, carbonates and/or water.

While copper materials have been described, the cathode active material need not be a copper material. In some cases, the active material of cathode 12 can be, for example, a silver compound (e.g., $Ag_2O$, AgO), a permanganate (e.g., $KMnO_4$, $Ba(MnO_4)_2$, $AgMnO_4$), a ferrate (e.g., $K_2FeO_4$, $BaFeO_4$), nickel oxide, nickel oxyhydroxide, cobalt oxyhydroxide, a manganese oxide, a bismuth oxide, or cobalt oxide. In general, the cathode active material can be any material that exhibits at least partial solubility (e.g., from about $10^{-7}$ mole/liter to about one mole/liter, about $10^{-6}$ mole/liter) in the system of which it is a part. Examples of cathode active materials are described in Provisional Patent Application No. 60/503,667, filed on Sep. 16, 2003, and entitled "Primary Alkaline Battery Containing Bismuth Metal Oxide", which is hereby incorporated by reference.

The conductive aid can increase the electronic conductivity of cathode 12. An example of a conductive aid is graphite particles. The graphite particles can be any of the graphite particles used in cathodes. The particles can be synthetic or nonsynthetic, and they can be expanded or nonexpanded. In certain embodiments, the graphite particles are nonsynthetic, nonexpanded graphite particles. In these embodiments, the graphite particles can have an average particle size of less than about 20 microns, for example, from about two microns to about 12 microns, or from about five microns to about nine microns as measured using a Sympatec HELIOS analyzer. Nonsynthetic, nonexpanded graphite particles can be obtained from, for example, Brazilian Nacional de Grafite (Itapecirica, MG Brazil (MP-0702X)). Alternatively or in addition, the conductive aid can include carbon fibers, described in commonly assigned U.S. Ser. No. 09/658,042, filed Sep. 7, 2000; and U.S. Ser. No. 09/829,709, filed Apr. 10, 2001. In some embodiments, cathode 12 includes from about one percent to about ten percent by weight of one or more conductive aids.

Examples of binders include polyethylene powders, polyacrylamides, Portland cement and fluorocarbon resins, such as polyvinylidenefluoride (PVDF) and polytetrafluoroethylene (PTFE). An example of a polyethylene binder is sold under the tradename Coathylene HA-1681 (available from Hoechst). Cathode 12 may include, for example, from about 0.1 percent to about one percent of binder by weight.

In some embodiments, cathode 12 can be assembled without using a binder and/or without using carbon. In certain embodiments, cathode 12 can be assembled using reactive sintering. As an example of reactive sintering, a blend of 67 percent CuO and 33 percent copper powder is pressed in a mold to create a pellet. The cathode pellet is then fired, in air, at about 400° C. to about 600° C., resulting in a free-standing conductive cathode pellet. In some cases in which reactive sintering is used to make a cathode, a portion of the copper powder can be replaced by fine, chopped copper fibers to, for example, provide a stronger and/or more conductive cathode pellet.

Anode 14 can be formed of any of the zinc materials used in battery anodes. For example, anode 14 can be a zinc gel that includes zinc metal particles, a gelling agent, and minor amounts of additives, such as gassing inhibitor. In addition, a portion of the electrolyte is dispersed throughout the anode.

The zinc particles can be any of the zinc particles used in gel anodes. Examples of zinc particles include those described in U.S. Ser. Nos. 08/905,254, 09/115,867, and 09/156,915, which are assigned to the assignee in the present application and are hereby incorporated by reference. The zinc particles can be a zinc alloy, e.g., containing a few hundred parts per million of indium and bismuth. Anode 14 may include, for example, from about 67 percent to about 80 percent of zinc particles by weight.

Examples of gelling agents include polyacrylic acids, grafted starch materials, salts of polyacrylic acids, polyacrylates, carboxymethylcellulose or combinations thereof. Examples of such polyacrylic acids are Carbopol 940 and 934 (available from Noveon Inc.) and Polygel 4P (available from 3V), and an example of a grafted starch material is Waterlock A221 (available from Grain Processing Corporation, Muscatine, Iowa). An example of a salt of a polyacrylic acid is Alcosorb G1 (available from Ciba Specialties). Anode 14 may include, for example, from about 0.1 percent to about one percent gelling agent by weight.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Anode 14 can include other materials. For example, in some embodiments, anode 14 can include metals capable of reducing a cathode containing a copper material. Suitable metals include, for example, aluminum, magnesium, calcium, silicon, boron, titanium, zirconium, hafnium, lanthanum, manganese, iron, cobalt, chromium, tantalum, or niobium. Binary, ternary, quaternary and other multi-component alloy combinations of these metals, and also those combinations including zinc with these metals, can be used.

The electrolyte can be any of the electrolytes used in batteries. The electrolyte can be aqueous or non-aqueous. An aqueous electrolyte can be an alkaline solution, such as an aqueous hydroxide solution, e.g., LiOH, NaOH, KOH, or a mixture of hydroxide solutions (e.g., NaOH/KOH). For example, the aqueous hydroxide solution can include from about 33 percent to about 40 percent by weight of the hydroxide material, such as about 9 N KOH (about 37 weight percent KOH). In some embodiments, the electrolyte can also include up to about four percent by weight of zinc oxide, e.g., about two percent by weight of zinc oxide.

In some embodiments, the electrolyte can be an aqueous salt solution (e.g., $ZnCl_2$, $NH_4Cl$, a mixture of $ZnCl_2$ and $NH_4Cl$, $ZnSO_4$, $Zn(ClO_4)_2$, $MgBr_2$, $Mg(ClO_4)_2$).

In some cases, the electrolyte can include a salt (e.g., Litriflate (tri-fluoro-methyl-sulfonate)) dissolved in a non-aqueous solvent (e.g., a mixture of dimethoxy ethane, ethylene carbonate, and propylene carbonate).

The electrolyte can include other additives. As an example, the electrolyte can include a soluble material (e.g., an aluminum material) that reduces (e.g., suppresses) the solubility of the cathode active material in the electrolyte. Electrolyte additives are described in commonly assigned U.S. Ser. No. 10/382,941, filed Mar. 6, 2003, the entire contents of which are incorporated by reference herein.

Housing 18 can be any housing commonly used in batteries, e.g., primary alkaline batteries. In some embodiments, housing 18 includes an inner metal wall and an outer electrically non-conductive material such as heat shrinkable plastic. Optionally, a layer of conductive material can be disposed between the inner wall and cathode 12. The layer may be disposed along the inner surface of the inner wall, along the circumference of cathode 12, or both. This conductive layer can be formed, for example, of a carbonaceous material. Such materials include LB1000 (Timcal), Eccocoat 257 (W.R. Grace & Co.), Electrodag 109 (Acheson Colloids Co.), Electrodag 112 (Acheson) and EB0005 (Acheson). Methods of applying the conductive layer are disclosed in, for example, Canadian Patent No. 1,263,697, which is hereby incorporated by reference.

Current collector 20 can be made from a suitable metal, such as brass. Seal 22 can be made, for example, of nylon.

Battery 10 can be assembled using conventional methods. In some embodiments, cathode 12 can be formed by a pack and drill method, described in U.S. Ser. No. 09/645,632, filed Aug. 24, 2000.

In some cases, battery 10 can include a hydrogen recombination catalyst to reduce in the cell the amount of hydrogen gas, which can be generated, for example, when copper metal is plated and zinc is oxidized. Suitable hydrogen recombination catalysts are described, e.g., in U.S. Pat. Nos. 6,500,576, and 3,893,870. Alternatively or in addition, battery 10 can be constructed to include pressure-activated valves or vents, as described, e.g., in U.S. Pat. No. 5,300,371.

Battery 10 can be, for example, a AA, AAA, AAAA, C, or D battery. In other embodiments, battery 10 can be non-cylindrical, such as coin cell, button cells, prismatic cells, or racetrack shaped cells. Battery 10 can include a multi-lobed electrode, as described in U.S. Ser. No. 09/358,578, filed Sep. 21, 1999.

The following examples are illustrative, and are not intended to be limiting.

EXAMPLES

Example 1

A battery separator with a bismuth trapping layer was prepared as follows.

Bismuth powder (−325 mesh, i.e. <45 µm particle size) was dispersed in a poly(acrylic acid)/ethanol/water solution with a high speed disperser. The loading of the bismuth was targeted to result in a composition that was 20 percent by volume bismuth powder and 80 percent by volume polymer.

The viscous mixture was coated onto a silicone-coated Mylar release liner using a 25 mil wet thickness draw-down applicator.

The material was dried under ambient conditions and removed from the release liner to yield a 60 micron, free-standing film.

The trapping layer as prepared above was used to form a multi-layer separator. The trapping layer was located in the middle of the separator, with a selective membrane at one end and a non-woven layer at the other end. The separator was assembled as follows.

A 54 micron poly(vinyl alcohol)-based non-woven fabric was wetted with water.

The bismuth-poly(acrylic acid) film (the trapping layer) was sandwiched between a 23 micron cellophane sheet and the poly(vinyl alcohol)-based non-woven fabric. The water in the non-woven fabric was sufficient to tackify the bismuth powder-poly(acrylic acid) film. A soft rubber roller was then rolled along the films to form inter-layer contact.

The sandwich structure was dried under ambient conditions to yield a multi-layer separator with good inter-layer adhesion.

The copper-trapping performance of the multi-layer separator prepared as described above was investigated in comparison with a conventional alkaline separator. The materials were used to separate a copper-containing aqueous KOH electrolyte from a non-copper-containing electrolyte.

After storage at 60° C. for two weeks, 13 ppm copper was determined to be present in the initially non-copper-containing electrolyte by UV-Vis spectroscopy when the solutions were separated by a conventional alkaline separator. However, with the bismuth-containing multi-layer separator, only four ppm copper was detected.

Example 2

A battery separator with a tin trapping layer was prepared as follows.

Tin powder (−325 mesh, i.e. <45 µm particle size) was dispersed in a poly(acrylic acid)/ethanol/water solution with a high speed disperser. The loading of the tin was targeted to result in a composition that was 20 percent by volume tin powder and 80 percent by volume polymer.

The viscous mixture was coated onto a silicone-coated release liner using a 25 mil wet thickness draw-down applicator.

The material was dried under ambient conditions and removed from the release liner to yield a 60 micron, free-standing film.

The trapping layer as prepared above was used to form a multi-layer separator. The trapping layer was located in the middle of the separator, with a selective membrane at one end and a non-woven layer at the other end. The separator was assembled as follows.

A 54 micron poly(vinyl alcohol)-based non-woven fabric was wetted with water.

The tin-poly(acrylic acid) film (the trapping layer) was sandwiched between a 23 micron cellophane sheet and the poly(vinyl alcohol)-based non-woven fabric. The water in the non-woven fabric was sufficient to tackify the tin powder— poly(acrylic acid) film. A soft rubber roller was then rolled along the films to form inter-layer contact.

The sandwich structure was dried under ambient conditions to yield a multi-layer separator with good inter-layer adhesion.

Example 3

A battery including a multilayer separator was prepared as follows.

Preparation of the Separator

A battery separator with a trapping layer that included both a bismuth-containing sub-layer and a zirconia (zirconium dioxide)-containing sub-layer was prepared according to the following procedure.

First, a dry film including bismuth was prepared. Using a high shear laboratory mixer (from Silverson L4RT-A) at 5000 rpm, 25 grams of Carbopol 934 were slowly added to 375 grams of ethanol. Next, 100 grams of Glascol E11 were slowly added to the mixture, with continued mixing, until a homogeneous viscous solution was obtained. Then, 150 grams of bismuth metal (−325 mesh, 99.5% metals basis) were slowly added to the mixture, and mixing was continued until the mixture was homogeneous. The viscous suspension was then coated in 6" wide strips onto a silicone-coated Mylar release liner, using a film applicator. The result was a dry film with a thickness of 90 microns.

In a separate process that occurred while the dry film was being prepared, a non-woven material including zirconia was prepared. Using a high shear laboratory mixer, 50 grams of zirconia nanopowder (from Aldrich Chemical Company) were dispersed in 500 grams of deionized water. Next, 38.46 grams of a 13% by weight poly(vinyl alcohol) [average molecular weight (Mw)=85,000-146,000, 87-89% hydrolyzed] solution were slowly added to the dispersion with continued mixing. Then, 20 grams of iso-propanol were added to the final dispersion, and a 54 micron poly(vinyl alcohol)-based non-woven fabric sheet was taped to a release liner. The dispersion was then impregnated into the non-woven fabric sheet by pouring the dispersion onto the non-woven fabric sheet, removing excess solution by running a straight-edged plastic shim across the surface of the non-woven fabric sheet, drying the non-woven fabric sheet at ambient temperature for one hour, and then repeating the process. Using a metal punch, 1.3 cm diameter circles were punched from the non-woven fabric. The non-woven fabric was dried at 60° C. Comparison to non-impregnated samples indicated a loading of $2.2\times10^{-3}$ grams $ZrO_2$-poly(vinyl alcohol) per square centimeter of non-woven fabric.

Separator material was then prepared according to the following procedure. A sheet of 6"×8" bismuth metal—poly(acrylic acid) film was removed from the release liner. The sheet was sprayed with a solution of 75 wt. % ethanol −25% deionized water to tackify the film. The film was then placed on the top surface of a 6"×8" sheet of 23 micron cellophane film. Thereafter, a 6"×8" sheet of the non-woven fabric containing $ZrO_2$-poly(vinyl alcohol) was placed on the free surface of the bismuth metal—poly(acrylic acid) material. The layers were compressed and brought into contact using a soft rubber roller. Subsequent drying under ambient conditions yielded a separator with good interlayer adhesion.

A separator cup was then formed, according to the following procedure. Strips of the above separator material (4.6 cm×6.6 cm) were cut and converted into a sealed separator cup. A 9.9 mm diameter hole was drilled in a PTFE block. Approximately 0.15 grams of molten hot-melt adhesive (Type 3748TC, from 3M) were placed at the bottom of the PTFE cavity. A separator strip was wrapped around a metal rod coated with a dry film PTFE mold release coating (from Sprayon Products). The separator was folded inward (approximately one millimeter) at the bottom of the metal rod, and was then immersed into the molten hot-melt adhesive. The adhesive was allowed to cool, and the separator was removed from the PTFE mold. Subsequent removal of the metal rod yielded a double-wrapped separator cup with a bottom seal.

Next, a battery was formed according to the following procedure. A cathode blend with the following composition was prepared in a small blender: 89.3 percent by weight copper (II) oxide, 4.5 percent by weight expanded graphite, 0.2 percent by weight Coathylene, and 6 percent by weight 9N KOH. Then, 22.9 grams of the blended cathode mixture were packed into a conventional AA can. Portions of the cathode mixture were added sequentially to the can with intermediate pressing of the powder inside of the can. After final pressing, a cavity was formed throughout the central length of the cathode, using a 9.9 mm drill. An AA cell was then fabricated by inserting the sealed separator cup into the cathode cavity and adding approximately 1.2 grams of 9N KOH electrolyte and approximately 5.6 grams of conventional zinc anode slurry. A seal assembly including a tin-plated brass current collector was placed into the open end of the cell, with the current collector dipping into the zinc slurry. The cell was crimped shut.

Three AA cells were formed according to the above procedure. After fabrication, the open circuit voltage (OCV) of the cells was approximately 1.4 V. The three cells were then stored at 60° C. The OCV rapidly dropped to 1.1-1.0 V, but then the cells maintained an OCV of >1.0 V for >28 days storage at 60° C. Similar cells constructed with conventional cellophane—non-woven separators (Duralam DT225, from Duracell, Aarschot, Belgium) failed within 48-72 hours.

Other Embodiments

Other embodiments are possible.

The separator can have different numbers of layers (e.g., two layers, three layers, four layers, five layers, six layers). In some cases, the separator can have multiple trapping layers. The components of the separator can be arranged in different ways. For example, and referring now to FIG. 3, a separator 60 has a middle portion 56 including a trapping layer 50 bonded on one side to a non-woven layer 54. On its other side, trapping layer 50 is attached to a selective membrane 52. On its side that is not bonded to trapping layer 50, non-woven layer 54 is bonded to a second selective membrane 52'. As shown, selective membrane 52 is positioned by cathode 12, while second selective membrane 52' is positioned by anode 14.

Figure 3:
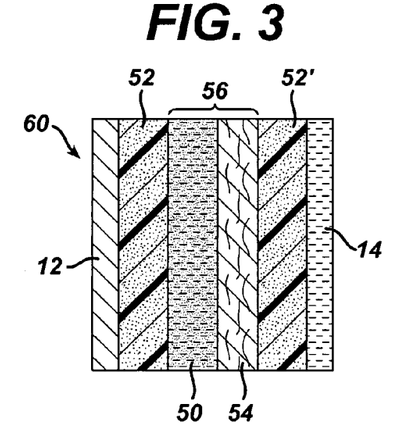
FIG. 3 is a schematic view of another embodiment of a separator.

Second selective membrane 52', like selective membrane 52, can control the diffusion of dissolved metal ions. It can also slow and/or limit the diffusion of products created by the trapping layer. Second selective membrane 52' conducts the electrolyte well and can be, for example, cellophane or grafted polyethylene. In some cases, second selective membrane 52' is identical to selective membrane 52, while in other cases second selective membrane 52' is different from selective membrane 52. For example, second selective membrane 52' can be of a different material and/or thickness than selective membrane 52.

Figure 4:
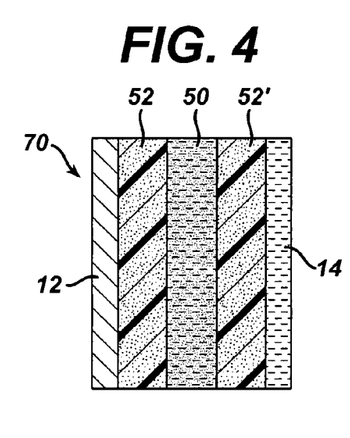
FIG. 4 is a schematic view of a third embodiment of a separator.

In FIG. 4, a separator 70 includes a trapping layer 50 between a selective membrane 52 and second selective membrane 52'. Selective membrane 52 is positioned by cathode 12, while second selective membrane 52' is positioned by anode 14. By having selective membranes on either side, trapping layer 50 of separator 70 can be prevented from becoming overburdened with dissolved metal ions.

Figure 5:
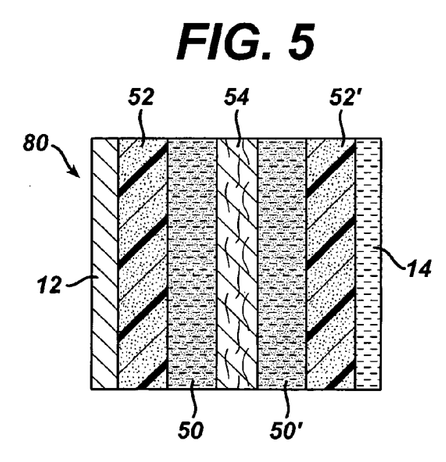
FIG. 5 is a schematic view of a fourth embodiment of a separator.

Referring now to FIG. 5, a separator 80 includes non-woven material 54 surrounded on both sides by trapping layers 50 and 50'. Trapping layers 50 and 50' may be identical or different. Trapping layer 50 is attached to selective membrane 52, while trapping layer 50' is attached to second selective membrane 52'. Selective membrane 52 is positioned by cathode 12, while second selective membrane 52' is positioned by anode 14.

By having two trapping layers 50 and 50', separator 80 can exhibit enhanced trapping capability. As an example, when trapping layers 50 and 50' are similar or identical, soluble metal ions which escape through trapping layer 50 may still be absorbed by trapping layer 50'. A separator with two trapping layers can achieve an efficient, cascading effect, in terms of its trapping capacity. For example, the main burden of dissolved metal ions can be absorbed by the first trapping layer (50), which may fail to trap a small fraction of these ions. Because the second trapping layer (50') is faced with fewer dissolved metal ions, it may remain in a relatively pristine condition, such that it can efficiently trap the small quantity of dissolved ions that were not trapped by the first trapping layer (50).

In some embodiments, trapping layers 50 and 50' are different from each other. For example, in some cases (such as in FIG. 5), trapping layer 50 is positioned between cathode 12 and trapping layer 50'. In such cases, trapping layer 50 can be designed to trap metal ions emanating from cathode 12, while trapping layer 50' can be designed to trap by-product ions formed during ion trapping reactions that occur in trapping layer 50. Alternatively or additionally, trapping layer 50' can be designed to directly trap dissolved metal ions that have escaped through trapping layer 50.

As an example, when separator 80 is designed to trap $Cu(OH)_4^{2-}$ dissolved metal ions, trapping layer 50 can contain bismuth metal powder, and trapping layer 50' can contain, e.g., nano-particle $ZrO_2$. In trapping layer 50, the following trapping reaction occurs:

$$2Bi + 3Cu(OH)_4^{2-} \rightarrow 3Cu + Bi_2O_3 + 3H_2O + 6OH^- \quad (8)$$

$Bi_2O_3$ generated in the above reaction is partially soluble in 9N KOH electrolyte. Dissolved $Bi_2O_3$ will migrate out of trapping layer 50, toward both the cathode and the anode. In some cases, dissolved $Bi_2O_3$ can cause hydrogen gassing to occur on a zinc anode. Trapping layer 50' can be used to avoid this problem by trapping the dissolved $Bi_2O_3$ before it reaches either the anode or the cathode. As an example, trapping layer 50' can include $ZrO_2$, such that it reacts with dissolved $Bi_2O_3$ as follows:

$$Bi_2O_3 + ZrO_2 \rightarrow Bi_2O_3 \cdot xZrO_2 \quad (9)$$

The product of the reaction between $Bi_2O_3$ and $ZrO_2$ is $Bi_2O_3 \cdot xZrO_2$, which is an insoluble complex of $Bi_2O_3 + ZrO_2$ (of an unknown composition).

In some cases, trapping layer 50' further includes a second trapping component capable of trapping the same dissolved metal ion that trapping layer 50 is designed to trap. As an example, trapping layer 50' can include an admixture of bismuth metal and $ZrO_2$. The bismuth metal can trap dissolved $Cu(OH)_4^{2-}$ ions that have gotten through trapping layer 50, while the $ZrO2$ can trap $Bi_2O_3$, according to equation 9 above.

All references, such as patent applications, publications, and patents, referred to herein are incorporated by reference in their entirety.

Other embodiments are in the claims.

What is claimed is:

1. A battery, comprising:
   a cathode including a cathode active material;
   an anode;
   an alkaline electrolyte; and
   a separator, between the anode and the cathode, comprising a first layer and a second layer,
   wherein the first layer comprises a polymeric matrix and metal particles that reduce a metal cation component of an ion generated from the cathode active material and dissolved in the electrolyte surrounded by the polymeric matrix, and the second layer comprises a non-woven material.

2. The battery of claim 1, wherein the dissolved ion is a polyatomic ion.

3. The battery of claim 1, wherein the dissolved ion is a metal cation.

4. The battery of claim 1, wherein the metal has a reduction potential that is more negative than a reduction potential of the metal cation component of the dissolved ion.

5. The battery of claim 4, wherein the metal has a reduction potential that is from about ten millivolts to about 2,100 millivolts negative to the reduction potential of the metal cation component of the dissolved ion.

6. The battery of claim 4, wherein the metal has a reduction potential that is from about 500 millivolts to about 1,500 millivolts negative to the reduction potential of the metal cation component of the dissolved ion.

7. The battery of claim 1, wherein the metal has a reduction potential that is positive to the reduction potential of hydrogen.

8. The battery of claim 1, wherein the metal has a hydrogen gas evolution over potential of from about 500 millivolts to about 750 millivolts measured at a $H_2$ evolution current density of one $mA/cm^2$ in alkaline electrolyte.

9. The battery of claim 1, wherein the metal is bismuth, tin, zinc, or indium.

10. The battery of claim 1, wherein the first polymer matrix comprises a polymer selected from the group consisting of poly(acrylic acid), poly(vinyl alcohol), poly(ethyleneoxide), poly(vinylpyrrolidone), poly(acrylamide), poly(vinyl butyral), and poly(4-styrenesulfonic acid).

11. The battery of claim 1, wherein the first layer further comprises a second material, and the second material traps a product of a reaction between the metal and the dissolved ion.

12. The battery of claim 11, wherein the second material is titanium dioxide or zirconium dioxide.

13. The battery of claim 1, wherein the first layer has a thickness of from about one micron to about 500 microns.

14. The battery of claim 1, wherein a thickness of the first layer is from about 30 percent to about 70 percent of a thickness of the separator.

15. The battery of claim 1, wherein the non-woven material comprises a material selected from the group consisting of polyvinyl alcohol fibers and rayon fibers.

16. The battery of claim 1, wherein the second layer comprises cellophane or grafted polyethylene.

17. The battery of claim 1, wherein the second layer comprises a second material that reduces a metal cation component of a dissolved ion.

18. The battery of claim 1, wherein the first layer contacts the second layer.

19. The battery of claim 1, wherein the first layer is separated from the second layer by at least one other layer.

20. The battery of claim 1, wherein the separator further comprises a third layer.

21. The battery of claim 20, wherein the first layer is disposed between the second layer and the third layer.

22. The battery of claim 20, wherein the second layer comprises cellophane or grafted polyethylene.

23. The battery of claim 22, wherein the third layer comprises cellophane.

24. The battery of claim 22, wherein the third layer comprises grafted polyethylene.

25. The battery of claim 22, wherein the first layer is disposed between the second layer and the third layer.

26. The battery of claim 20, wherein the second layer comprises a non-woven material and the third layer comprises cellophane or grafted polyethylene.

27. The battery of claim 26, wherein the first layer is disposed between the second layer and the third layer.

28. The battery of claim 26, wherein the separator further comprises a fourth layer.

29. The battery of claim 28, wherein the fourth layer comprises a second material that reduces a metal cation component of a dissolved ion.

30. The battery of claim 29, wherein the first layer is disposed between the third layer and the fourth layer.

31. The battery of claim 28, wherein the fourth layer comprises cellophane.

32. The battery of claim 28, wherein the fourth layer comprises grafted polyethylene.

33. The battery of claim 28, wherein the fourth layer contacts the second layer.

34. The battery of claim 28, wherein the fourth layer contacts the first layer.

35. The battery of claim 28, wherein the fourth layer is separated from the first layer by at least one layer.

36. The battery of claim 28, wherein the separator further comprises a fifth layer.

37. The battery of claim 36, wherein the fourth layer comprises cellophane.

38. The battery of claim 36, wherein the fourth layer comprises grafted polyethylene.

39. The battery of claim 36, wherein the fifth layer comprises a second material that reduces a metal cation component of a dissolved ion.

40. The battery of claim 39, wherein the first layer and the fifth layer are disposed between the third layer and the fourth layer.

41. The battery of claim 20, wherein the second layer comprises a second material that reduces a metal cation component of a dissolved ion.

42. The battery of claim 41, wherein the third layer is a non-woven material.

43. The battery of claim 42, wherein the third layer is disposed between the first layer and the second layer.

44. The battery of claim 20, wherein the second layer comprises a second material that sorbs a metal cation component of a dissolved ion.

45. The battery of claim 1, wherein the cathode active material comprises CuO and the dissolved ion comprises $Cu(OH)_4^{2-}$ or $Cu(OH)_4^{3-}$.

46. The battery of claim 1, wherein the separator further comprises cellophane or grafted polyethylene.

47. The battery of claim 46, wherein a thickness of the cellophane or grafted polyethylene is from about ten percent to about 25 percent of a thickness of the separator.

48. The battery of claim 1, wherein the separator further comprises a non-woven material.

49. The battery of claim 48, wherein the non-woven material comprises polyvinyl alcohol fibers.

50. The battery of claim 48, wherein the non-woven material has a thickness of from about 30 microns to about 120 microns.

51. The battery of claim 48, wherein the non-woven material has a thickness of from about 25 percent to about 60 percent of a thickness of the separator.

52. The battery of claim 1, wherein the second layer is adjacent to the anode.

53. The battery of claim 52, wherein the second layer comprises cellophane or grafted polyethylene.

54. The battery of claim 53, wherein the separator further comprises a third layer.

55. The battery of claim 54, wherein the third layer comprises cellophane.

56. The battery of claim 55, wherein the second layer is adjacent to the anode and the third layer is adjacent to the cathode.

57. The battery of claim 54, wherein the third layer comprises grafted polyethylene.

58. The battery of claim 52, wherein the cathode active material includes a copper material.

59. The battery of claim 52, wherein the cathode active material includes a copper oxide or a copper hydroxide.

60. The battery of claim 59, wherein the cathode active material includes a copper oxide.

61. The battery of claim 1, wherein the cathode active material includes a member selected from the group consisting of ferrates, permanganates, nickel oxide, nickel oxyhydroxide, cobalt oxide, cobalt oxyhydroxide, manganese oxides, or bismuth oxides.

62. The battery of claim 1, wherein the alkaline electrolyte includes potassium hydroxide.

63. The battery of claim 1, wherein the cathode active material includes CuO, the anode includes zinc, the electrolyte includes potassium hydroxide, and the dissolved ion in $Cu(OH)_4^{2-}$.

64. The battery of claim 1, wherein the polymeric matrix is a solvent and ion permeable gel matrix.

65. The battery of claim 64, wherein the polymer matrix is selected from the group consisting of poly(acrylic acid), poly(vinyl alcohol), poly(ethyleneoxide), poly(vinylpyrrolidone), poly(acrylamide), poly(vinyl butyral), and poly(4-styrenesulfonic acid).

66. The battery of claim 1, wherein the dissolved ion is a polyatomic ion.

67. The battery of claim 66, wherein the polymeric matrix is a solvent and ion permeable gel matrix.

68. The battery of claim 67, wherein the polymer matrix is selected from the group consisting of poly(acrylic acid), poly(vinyl alcohol), poly(ethyleneoxide), poly(vinylpyrrolidone), poly(acrylamide), poly(vinyl butyral), and poly(4-styrenesulfonic acid).

69. A battery, comprising:
 a cathode including a cathode active material;
 an anode;
 an alkaline electrolyte; and
 a separator, between the anode and the cathode, comprising a first layer and a second layer wherein the first layer comprises a polymeric matrix and a first material surrounded by the polymer matrix, wherein the first material reduces a metal cation component of an ion generated from the cathode active material and dissolved in the electrolyte, and wherein the first material is not a salt.

* * * * *